United States Patent [19]

Stock et al.

[11] 4,257,518

[45] Mar. 24, 1981

[54] FEEDER FOR PARTICULATE MATERIAL

[75] Inventors: Arthur J. Stock, Lakewood; Donald E. Christofer, Mentor, both of Ohio

[73] Assignee: Stock Equipment Company, Cleveland, Ohio

[21] Appl. No.: 954,353

[22] Filed: Oct. 25, 1978

[51] Int. Cl.³ .................... B65G 37/00; G01G 11/10
[52] U.S. Cl. .................................. 198/504; 198/544; 198/551; 198/603; 222/55
[58] Field of Search ............. 198/504, 543, 544, 551, 198/567, 603; 414/173; 222/55, 252; 110/186, 269

[56] References Cited

U.S. PATENT DOCUMENTS

| 587,509 | 8/1897 | Roberts | 198/603 X |
|---|---|---|---|
| 3,161,485 | 12/1964 | Buhrer | 198/603 X |
| 3,187,944 | 6/1965 | Stock | 222/55 X |
| 3,568,820 | 3/1971 | Patch | 198/603 |
| 4,011,999 | 3/1977 | Glaeser | 198/603 X |

FOREIGN PATENT DOCUMENTS

1232099 10/1960 France .................................... 110/269

Primary Examiner—Jeffrey V. Nase
Attorney, Agent, or Firm—Pearne, Gordon, Sessions, McCoy & Granger

[57] ABSTRACT

Feeder apparatus for feeding at a controlled variable rate particulate solid material, such as coal, from a supply conduit located above a gravimetric feeder to a discharge chute located below the feeder. The particulate material flows to the feeder from the supply conduit along a path having a generally vertical center line and the discharge chute provides a flow path having a generally vertical center line closely laterally spaced relative to the center line of flow to the feeder. The feeder apparatus has a horizontally extending housing with an upwardly facing inlet through which the material flows to the feeder and a downwardly facing outlet forming part of the discharge chute through which the material flows from the feeder. Within the housing is a main feeder conveyor including an endless belt with a generally horizontal span adapted to receive at one end the particulate material flowing to the feeder and to convey in a layer a measured quantity of material a horizontal distance across weighing means to an exit zone at the opposite end of the belt, the horizontal distance being substantially greater than the spacing between the center lines of flow to the feeder and through such discharge chute. Associated with the main feeder conveyor is a gravimetric control system for controlling the amount of material deposited on the belt. Particulate material that drops off the main conveyor belt at the exit zone is received on a return belt conveyor and carried in a reverse direction a sufficient distance to bring the material to the discharge chute. Cooperation between the main feeder conveyor and the return conveyor permits gravimetric feeding of particulate material to the discharge chute that is closely laterally spaced to the flow path of material to the main conveyor by a distance that is substantially less than the length of travel of the material on the main conveyor.

6 Claims, 5 Drawing Figures

FEEDER FOR PARTICULATE MATERIAL

BACKGROUND OF THE INVENTION

This invention relates to apparatus for feeding particulate material, such as coal particles to be burned in a coal combustion system in an electric power plant in which the coal is fed at a controlled rate from supply means to a discharge chute that delivers the coal to a furnace component. More particularly, the invention relates to gravimetric feeder apparatus whose rate of discharge is controllable in terms of the weight of material being discharged per unit of time, and especially to such gravimetric feeder apparatus adapted for installations where the supply means and discharge chute have flow paths with center lines closely spaced from another by a distance substantially less than the length of the horizontal span across which the coal must be transported to accomplish the continuous weighing by the gravimetric feed control system. Although the present invention is particularly adapted for feeding coal in power plants, the invention is useful in the feeding of particulate material in general. Although terms specific to coal will be used herein, it is not intended that the basic concept of the invention be restricted to feeding coal.

In many installations of the type to which the present invention is applicable, coal or other particulate material is stored in and supplied from one or more overhead storage means and fed downwardly by gravity to one or more locations where it is to be utilized. In a coal combustion system of a coal-burning power plant, the overhead storage means is usually a hopper or bunker, and the combustion apparatus to which the coal is supplied usually includes pulverizers, boiler stokers, or cyclone burners.

Known gravimetric feeders, such as that shown and described in U.S. Pat. No. 3,187,944, the disclosure of which is incorporated by reference herein and made a part hereof, are designed to feed coal by weight to such coal combustion systems.

Generally, such a gravimetric feeder receives the particulate coal in the form of what might be termed a continuous mass or columm moving in a fixed flow path, and delivers the coal at a controlled rate as free-falling or separately flowing particles. The rate of discharge is controllable in terms of the weight of the material being discharged. Since feeding by control of weight can be more accurate, such a feeder makes possible accurate control of the fuel-air ratio. A feeder of this type makes it possible to divide the total coal flow equally among several firing units of a single boiler.

Such a feeder utilizes a horizontal conveyor located within a housing adapted to contain gas at a pressure higher than ambient atmospheric air pressure. The conveyor includes an endless flexible belt and has an upper span or run that receives coal through an inlet in the vessel in the form of a solid column from the hopper. The upper belt run transports a layer of the coal at a level controlled by an adjustable leveling bar or valve across a weighing span of predetermined length in the upper belt run, which weighing span is supported by three spaced parallel rollers, the center roller being a weighing roller. The weighing roller thus carries one-half the weight of coal on the weighing span and the weight carried thereby is sensed by a lever scale, or the like, adjusted to a desired "balance" weight. If the weight sensed varies from that desired, then the weighing mechanism automatically moves a leveling bar to adjust the depth (and thus the weight) of coal transported on the belt.

Usually the gravimetric feeder includes as additional components a scraper to keep the return span of the belt as clean as possible and a cleanout conveyor to remove accumulated dust from the bottom of the housing. The cleanout conveyor ordinarily utilizes transverse metal flights that move longitudinally of a metal through. Normally, the cleanout conveyor needs to be operated only a few minutes each hour.

As a practical matter, in order to make possible the above operation, the length portion of the upper span of the belt from the center line of the flow path of the coal being fed from the hopper to the exit or drop-off zone at the opposite end of the belt must be substantial, at least about six feet for a gravimetric feeder of the type indicated above, to provide space for the mechanisms and other apparatus necessary to perform the weighing and control functions. Therefore, the center line of the coal column feeding to the feeder must be spaced horizontally for a substantial distance from the location at which the coal discharges from the feeder belt. Heretofore, the coal has been discharged directly downwardly by gravity into a discharge chute.

In some installations, however, such as existing installations, where it is necessary or desirable to install a gravimetric feeder the center line of the flow path of the column of coal to the feeder is coextensive with, or closely laterally spaced to, the center line of the flow path through the discharge chute, so that such spacing is therefore substantially less than the space indicated above as required between the feed and discharge portions of the belt. Incorporation of a gravimetric feeder into such an existing installation has not been possible.

The present invention, however, permits installation of a gravimetric feeder in such installations in which the flow paths of the hopper and discharge chute are closely spaced; and it also affords other features and advantages not obtainable in the prior art.

SUMMARY OF THE INVENTION

It is among the objects of the invention to provide gravimetric feeder apparatus for feeding particulate material, such as coal, from supply means to a discharge chute wherein the center line of the flow path of the material being fed to the feeding apparatus is closely spaced to the center line of the flow path of the discharge chute, by a spacing substantially less than the horizontal distance heretofore required for measuring and feeding in the gravimetric feeder systems.

Another object of the invention is to permit installation of feeder apparatus having necessarily long horizontal longitudinal dimension, in an existing system in which the flow of particulate material fed to the feeder apparatus has a flow center line that is coextensive with, or closely spaced to, the center line of the flow path of a discharge chute.

These and other objects are accomplished by the novel apparatus of the invention in which a gravimetric feeder conveyor is located between a conduit that delivers a particulate material such as coal through a flow path with a generally vertical center line and a lower discharge chute also having a flow path with generally vertical center line. The feeder apparatus includes a housing having an upwardly facing inlet communicating with the conduit and a downwardly facing outlet leading to the discharge chute, and means for maintaining a gas pressure in the housing differing from the ambient atmospheric pressure.

Located in the housing is a main feeder conveyor with a generally horizontal span adapted to receive particulate material in a flow path at one end thereof and to convey a layer of the material on the conveyor over a lateral distance substantially greater than the spacing between the center lines of the flow paths of the material being fed to the conveyor and the discharge chute, respectively. The belt drops the material off at the opposite end thereof into an exit zone that is spaced outwardly a substantial horizontal distane from both such center lines. Associated with the main feeder conveyor is gravimetric weighing means that measures the rate of flow of material along the span and operates means to control the rate of flow of material onto the conveyor as required.

A second or return conveyor is located in the housing below the main conveyor and includes an upper span that is positioned to receive material that drops off the main feeder conveyor in the exit zone and transport the material in a reverse direction a sufficient distance to discharge it above the discharge chute. The return conveyor may be generally horizontal or may be located at an angle extending downward to fit into existing structure.

DESCRIPTION OF THE PREFERRED EMBODIMENTS

Figure 1:
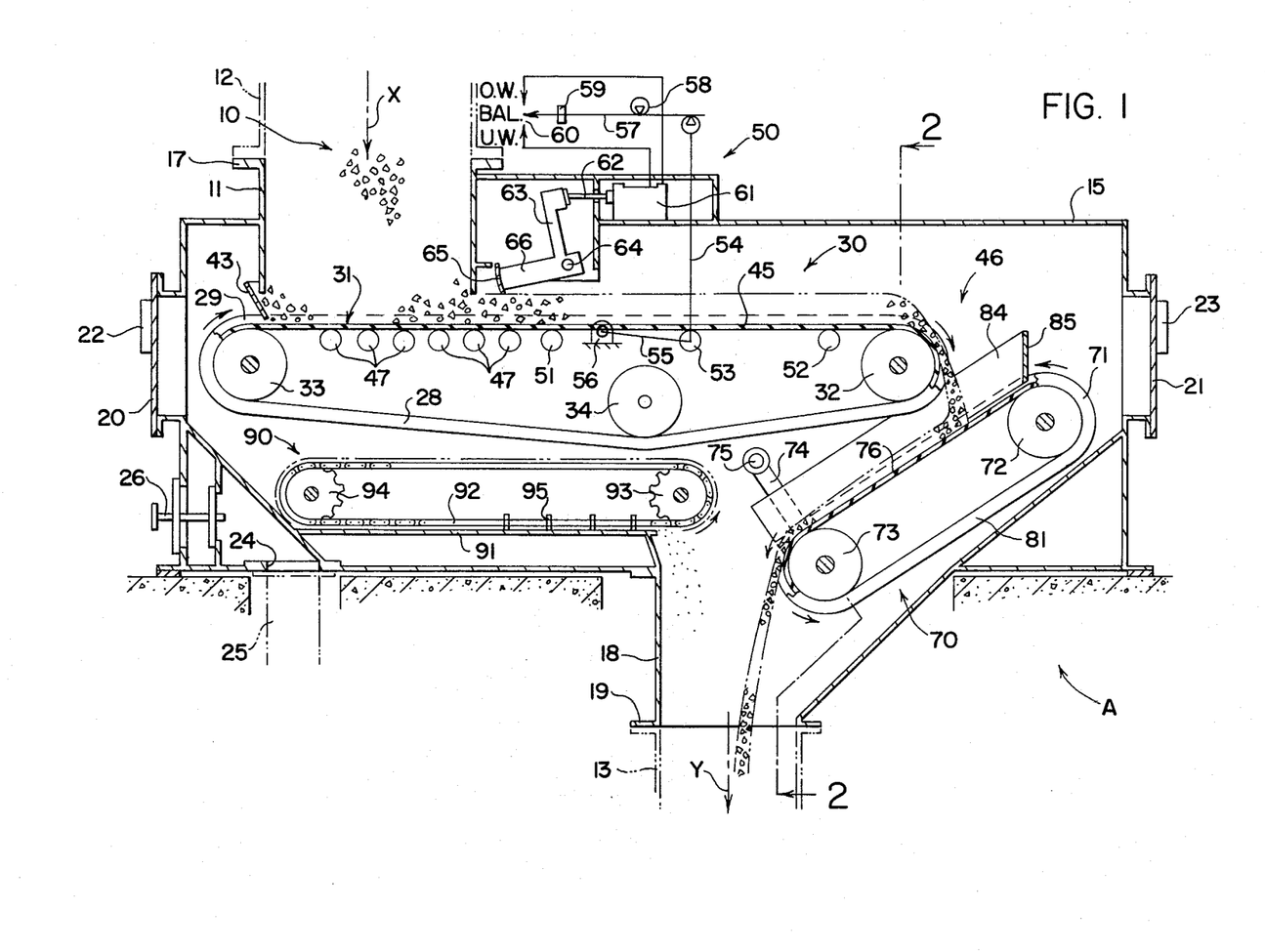
FIG. 1 is a central longitudinal sectional view through a gravimetric feeder embodying the invention.
Figure 2:
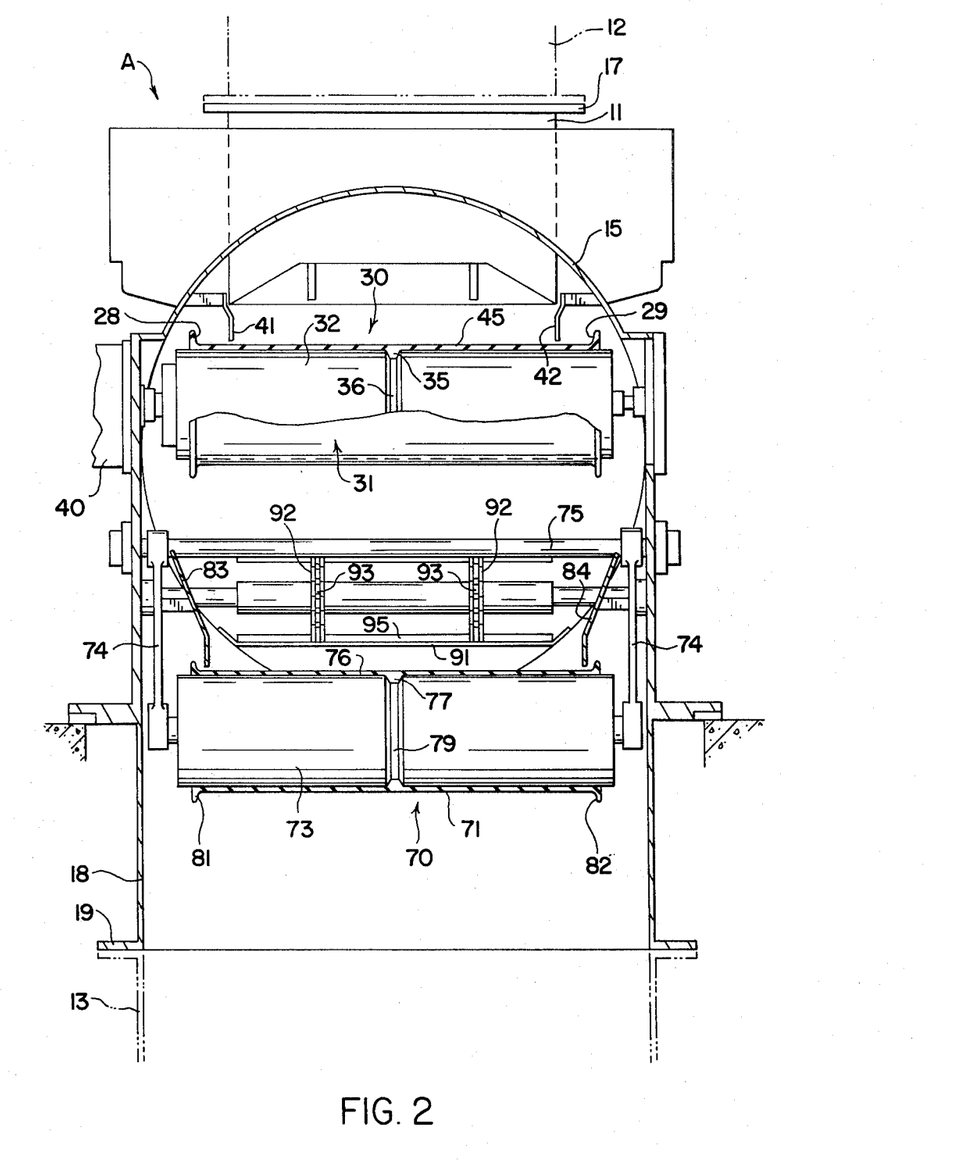
FIG. 2 is a sectional view on an enlarged scale taken on the line 2—2 of FIG. 1.

Referring more particularly to the drawings, and initially to FIGS. 1 and 2, there is shown gravimetric coal feeder apparatus A adapted to receive a column or mass 10 of particulate coal through an inlet conduit 11, from a hopper 12, shown in broken lines, the column having a path of flow with a center line indicated by vertical arrow X. Apparatus A feeds the coal from the column 10 at a controlled rate of flow to a discharge chute or conduit 13, shown in broken lines, and having a path of flow with a center line indicated by vertical arrow Y. The coal is delivered to the discharge chute as free-falling or separately flowing particles and the rate of flow is controllable in terms of the weight of the material being discharged.

The feeder apparatus A includes an elongated housing 15 with upwardly open inlet 11 having an annular flange 17 at the top, for use in connecting the inlet 11 to the outlet of hopper 12, and a downwardly facing outlet 18 with an annular flange 19 at its lower end for use in bolting the outlet 18 to discharge chute 13. The housing 15 may be formed, for example, of steel of suitable strength. Access doors 20 and 21 are located at the opposite ends of the cylindrical housing 15 and each has a viewing window 22 and 23, respectively, to facilitate inspection of the interior of the feeder.

A purge air inlet 24 is formed in the bottom of the housing 15 and communicates with a purge air supply line 25. The entry of pressurized purge air into housing 15 is controlled by a valve 26 operable from outside the housing.

Located within the housing 15 is a main feeder conveyor generally indicated by the numeral 30 and including an endless belt 31 formed of molded, fabric-reinforced rubber and passing between a power-driven head pulley 32 and a tail pulley 33. Tension in the belt 31 is maintained by a tension roller 34. The belt 31 has a central V-shaped rib 35 formed in the inside thereof that seats in a V-shaped groove 36 in the head pulley 32 and in a similar groove (not shown) in tail pulley 33, as well as in a V-shaped groove (not shown) in the tension roller 34. Also, the belt 31 has upwardly projecting curbs 28 and 29 formed on opposite sides thereof to guide the coal carried thereon and minimize overflow of the coal at the sides of the belt. Head pulley 32 is driven by a known variable speed motor 40. By known means, not shown, the speed of the output shaft of motor 40 that drives pulley 32 is controlled by an electrical voltage furnished by combustion control means for the furnace to which coal is supplied by the feeder, to assure a coal feed rate that accurately corresponds to the combustion requirements of the furnace.

As indicated in FIGS. 1 and 2, the deposit of a layer of coal from the column 10 onto the belt 31 is guided by a pair of parallel side plates 41 and 42 and by an inclined skirt plate 43 located at the left-hand end of the conveyor 30. Preferably, the plates 41, 42 and 43 are formed of stainless steel. A layer of coal is carried from left to right as viewed in FIG. 1, from the bottom of the column 10 across the upper span 45 of the endless belt 31 to an exit, or drop-off, zone 46 at the right-hand end of the span 45. The left-hand portion of the upper span 45, which, for the most part, lies under the column 10 of coal, is supported by suitable means such as a flat plate or the illustrated six equally spaced parallel support rollers 47.

The control of the rate of flow of coal from the column 10 to the exit zone 46 is accomplished by means of a gravimetric feed system 50, the particulars of which are more specifically shown and described in the aforesaid U.S. Pat. No. 3,187,944. Briefly stated, the gravimetric feed system 50 comprises three parallel, equally-spaced-apart rollers, including a pair of weigh span rollers 51 and 52, and a weighing roller 53 located intermediate the rollers 51 and 52. The weighing roller 53 is supported by a pair of weighing roller support rods, shown diagrammatically at 54, located on opposite sides of the upper span 45 of the belt 31. Also, the axis of the weighing roller 53 is mounted on one end of an arm, or link, shown diagrammatically at 55, extending generally horizontally and pivoted at its opposite end in support 56. The arm 55 serves to locate the weighing roller 53 in its desired longitudinal position relative to the upper span 45. It will be noted that other components of the gravimetric control system are shown diagrammatically in FIG. 1.

The upper ends of the rods 54 are connected to a lever 57 which is pivoted on a knife edge support 58. The force of the rods 54 is counterbalanced by a poise 59, which is movably mounted on the lever 57 to permit the adjustment of the system to balance the lever at a desired weight condition. The opposite, or left-hand, end of the lever 57, as viewed in FIG. 1, is operatively associated with a scale mechanism 60 which is adapted to sense either an overweight or underweight condition with reference to the weight of the coal in the weighing span portion 45 of the upper span of belt 31 between the weigh span rollers 51 and 52. The scale mechanism actuates suitable switches (not shown) such as optical switches which in turn control an electric motor 61. The motor turns a screw 62 operatively connected to an arm 63 of a crank that pivots about a pivot 64.

A leveling bar 65, carried on arm 66 of the crank substantially perpendicular to arm 63, is positioned at the upstream end of the column 10 of coal in the inlet 16 and regulates through its raising and lowering movement the level (and thus the weight) of the layer of coal carried from the column by the upper span 45 of the endless belt 31. The gravimetric control system which is illustrated generally in schematic form in FIG. 1, is shown and described in more detail in U.S. Pat. No. 3,187,944.

It will be apparent from FIG. 1 that the center line X of the column 10 of coal being fed from the hopper 12 is closely spaced to the vertical center line Y of flow of coal into the discharge chute 13 and that the exit end of the endless belt 31 is at a much greater distance from the center line X than the center line Y. Accordingly, in order to return the coal being fed by the feeder conveyor 30 to the discharge zone above the discharge chute 13, there is provided in accordance with the invention, a return conveyor 70. The return conveyor is inclined downwardly at about a 35° angle from right to left toward the discharge chute 13, as indicated in FIG. 1, and includes an endless belt 71 that passes between a power driven head pulley 72 and a tail pulley 73. The head pulley rotates about a fixed axis. The tail pulley 73 is supported on a pair of diagonally extending arms 74 connected at their upper ends to a pivot rod 75, so that the weight of the tail pulley 73 maintains tension in the belt 71. The upper span 76 of the belt 71 is adapted to receive the coal that drops off the right-hand end of the endless belt 31 and carry the coal in a reverse direction at a somewhat downward slope to a discharge zone at the left-hand end of the upper span 76, as viewed in FIG. 1. In this way, the required length (six feet or more) of the upper span 35 of the endless belt 31 can be accommodated within adequate longitudinal space for the gravimetric feeding system 50, even though the center lines X and Y are much more closely spaced to one another than the distance required between the pulleys 32 and 33.

The belt 71 has an internal V-shaped rib 77 that seats in corresponding a V-shaped groove 79 in pulley 73, a similar groove, not shown being provided in pulley 72. Also, the belt 71 has a pair of parallel curbs 81 and 82 on opposite side edges of the belt 71 to minimize overflow of coal carried on the upper span 76.

Additional guiding of coal on the upper span 76 is achieved by parallel side plates 83 and 84 secured to the internal wall of the housing 15, and by an inclined skirt plate 85 located at the upper end of the return conveyor 70.

A cleanout conveyor 90 is also provided to remove spilled particulate coal from a bottom plate 91 in the housing and onto which coal particles may drop during operation. The cleanout conveyor includes a pair of parallel chains 92 that pass between pairs of parallel head sprockets 93 and tail sprockets 94, the head sprockets being power driven by known means, not shown. The links of the chain carry spaced parallel transversely extending flights 95 that pass along and contact the floor 91 and push spilled coal particles into the outlet 18 forming part of the discharge chute 18.

Figure 3:
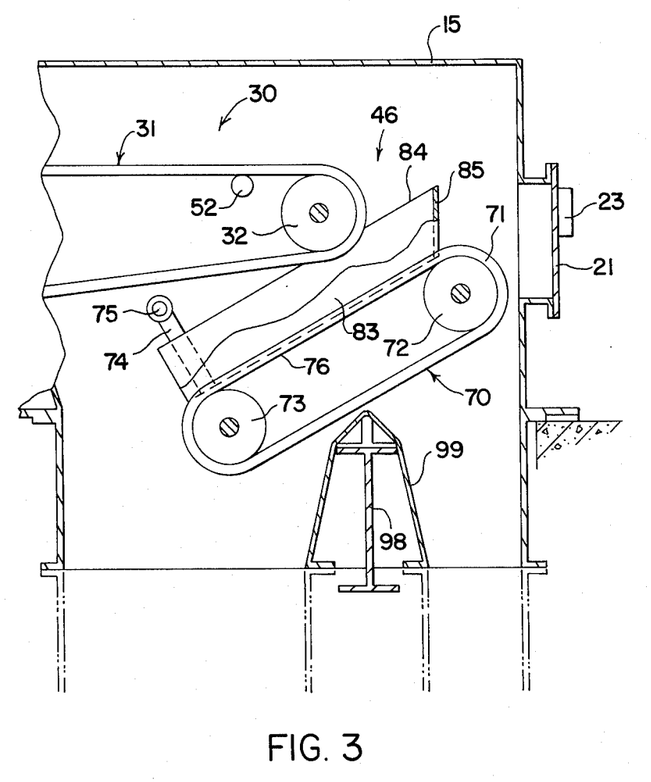
FIG. 3 is a fragmentary sectional view similar to FIG. 1 and illustrating a modified form of the embodiment of FIG. 1.

FIG. 3 shows an alternate form of the gravimetric coal feeder A of FIGS. 1 and 2, wherein special accommodation must be made for existing structure, such as a structural steel I beam 98, extending laterally through the zone occupied by the right-hand, or discharge, end of the feeder. In this instance, the beam 98 is provided with a sheet metal shroud 99 that divides the discharge portion into two sections. Since the apparatus of FIG. 3 is in most respects identical to that of FIG. 1, like numerals are used on corresponding parts for convenience.

Figure 4:
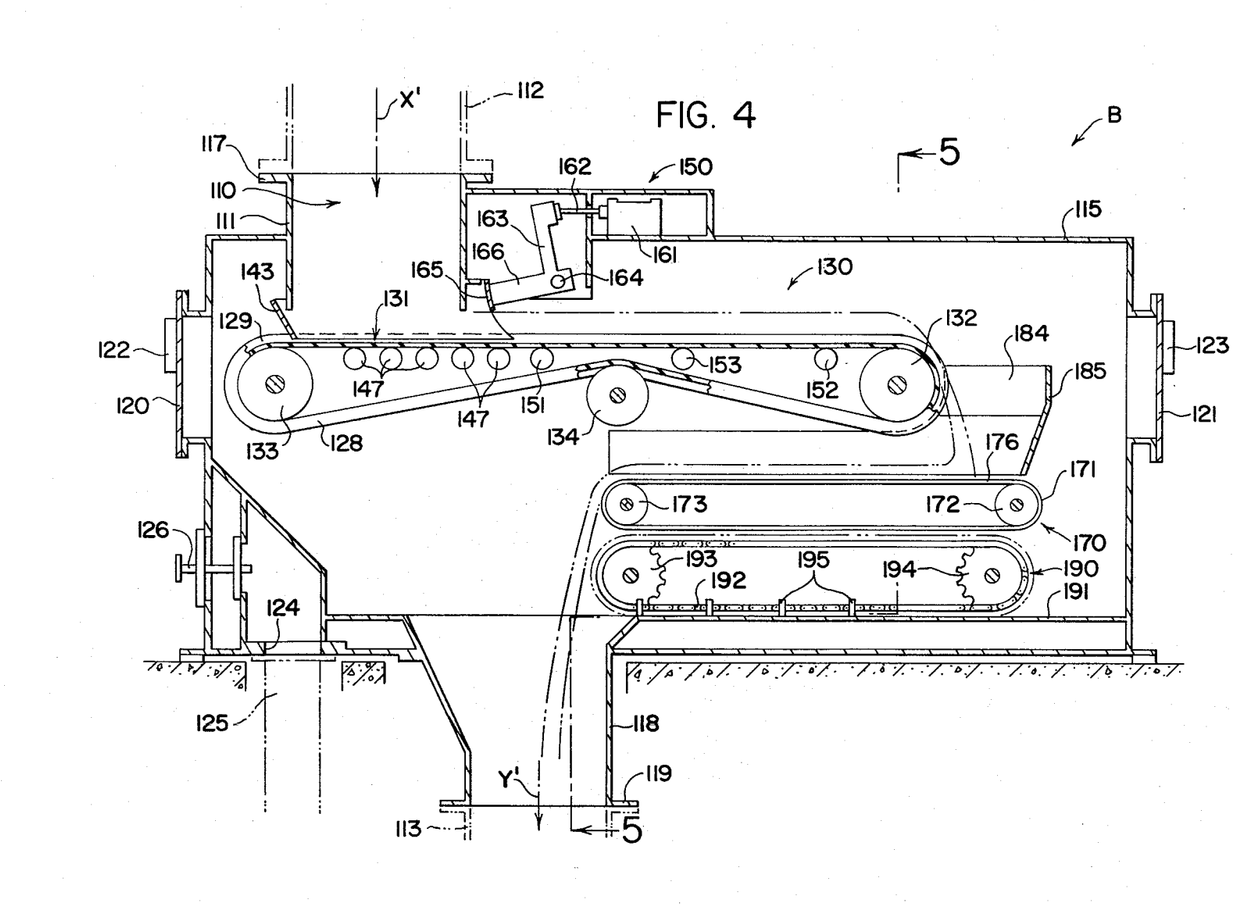
FIG. 4 is a central longitudinal sectional view through an alternate form of gravimetric feeder embodying the invention.
Figure 5:
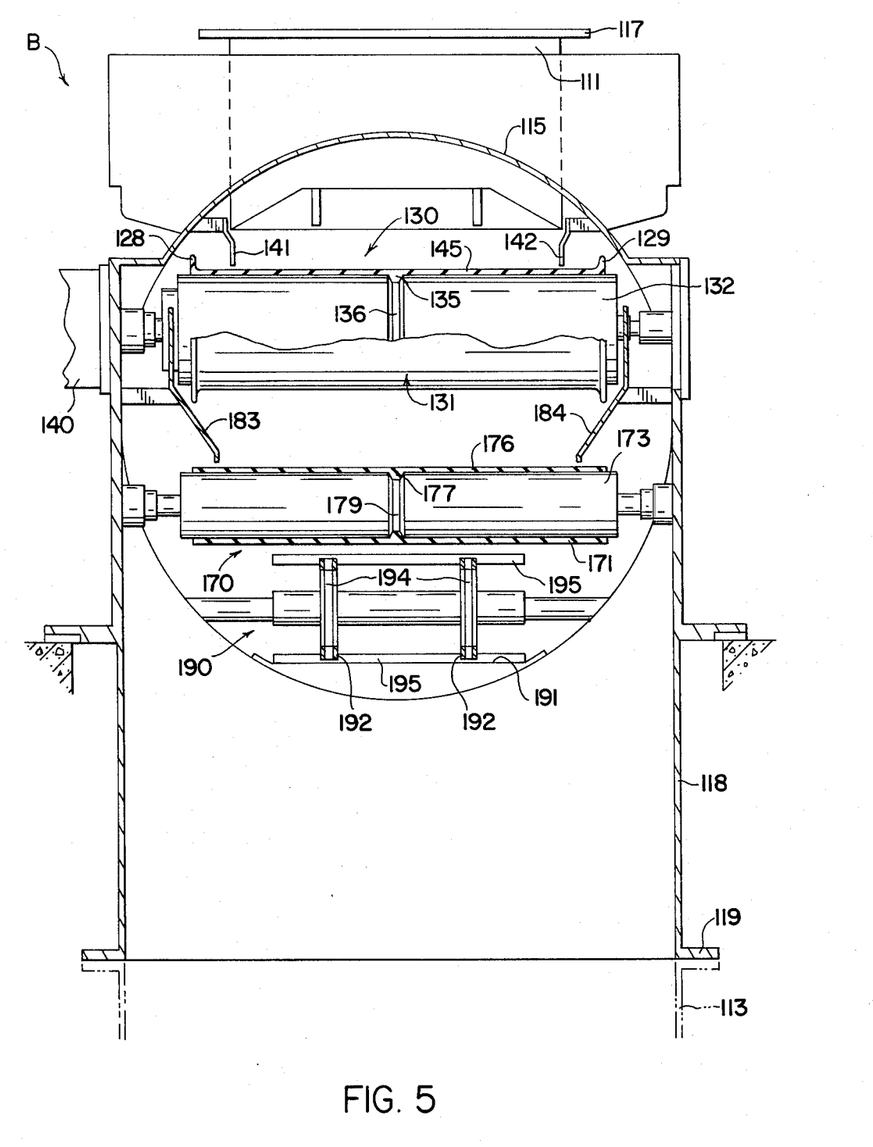
FIG. 5 is a sectional view taken on the line 5—5 of FIG. 4.

FIGS. 4 and 5 show a modified form of gravimetric coal feeder B which illustrates an embodiment of the invention adapted for use in another situation where the flow center lines of the column from the hopper and the coal flow into the discharge chute are closely spaced, in this case even more closely spaced than the situation illustrated in FIGS. 1 and 2.

In FIGS. 4 and 5, the description will be limited to those aspects thereof which are distinct from the embodiment of FIGS. 1 and 2, and the numerals used to identify like parts will begin with the numeral 110, but otherwise correspond to the two-digit numerals used to describe corresponding parts in FIGS. 1 and 2.

The gravimetric coal feeder B is adapted to feed coal at a controlled rate from a column 110 of coal from a hopper 112 located above, the column 110 having a center line of flow shown by arrow X'. Coal from the column 110 is fed at a controlled rate to a discharge chute 113 having a center line of flow shown by arrow Y'. The feeder B has a generally cylindrical housing 115 with an inlet 111 having an annular flange 117 to facilitate bolting to outlet of hopper 112 and an outlet 118 located on the bottom thereof with an annular flange 119 to facilitate bolting to discharge chute 113.

Access doors 120 and 121 are located at opposite ends of the housing 115, and each has a viewing window 122 and 123, respectively, to permit visual inspection of the interior of the housing 115.

Here, again, there is provided a purge-air inlet 124 that communicates with a purge-air pressure line 125 to supply pressure air to facilitate the purging of the chamber within the housing 115. The admission of purge-air is controlled by the adjustable valve 126.

Within the housing 115 is a feeder conveyor 130 comprising an endless belt 131 traveling around head pulley 132 driven by motor 140, and tail pulley 133. Conveyor 130 is essentially identical to the conveyor 30 of the embodiment of FIGS. 1 and 2, except that its tension roller 134 bears against the outside surface of the lower span of belt 131.

In all other respects, both the feeder conveyor 130 and the gravimetric feed system 150 are essentially identical to those of the embodiment of FIGS. 1 and 2, and will not be further described herein.

It will be noted that the center lines of flow X' and Y', respectively, are much closer to one another than in the embodiment of FIGS. 1 and 2, and, accordingly, the variant form of FIGS. 4 and 5 shows a modification adapted to provide an even greater return travel of coal from the exit end of the feed conveyor 130 in a reverse direction. This is accomplished by means of a generally horizontal return conveyor 170 that is adapted to carry particulate coal that drops thereon at the righthand end thereof in a return, or reverse, direction, moving from right to left, as viewed in FIG. 4, to the discharge zone immediately above the discharge chute 113.

The conveyor 170 includes an endless belt 171 that passes between a power driven head pulley 172 and a tail pulley 173. While no means of tensioning the endless belt 171 is shown, some tensioning means may be desirable in certain circumstances. In the present instance, proper tension is maintained by adjusting the space between the respective parallel axles of the head pulley 172 and tail pulley 173.

Here, again, the belt 171 has an inwardly facing central V-shaped rib 177 that is received in a corresponding V-shaped groove 179 in the tail pulley 173, and in a similar groove, not shown, in the head pulley 172.

Some coal may fall from the side edges of the belt 171 of conveyor 170. Therefore, a cleanout conveyor 190 is provided and mounted with its lower span immediately above a floor section 191 that extends all the way to the outlet 118 forming part of the discharge chute 113. Cleanout conveyor 190 in this embodiment extends generally horizontally beneath and substantially throughout the length of, conveyor 170, to the outlet 118. The cleanout conveyor 190 includes a pair of parallel chains 192 extending between and around pairs of parallel power-driven head sprockets 193 and tail sprockets 194, the pairs of sprockets 193 and 194 being mounted on rigid sleeves to assure parallel operation. Carried by certain links of the chains 192 are transversely extending spaced parallel cleanout flights 195, which move across and contact the floor 191, to move accumulated spilled coal and discharge it into outlet 118 of discharge chute 113.

In this and the previous embodiment the cleanout conveyor need not be operated continuously, but may be utilized for short periods of time, such as for a few minutes every hour, to remove spilled coal.

It will be apparent that by utilizing the forms of the invention illustrated by embodiments A and B of FIGS. 1–5, a gravimetric feeder of the type described may be adapted to those situations where the center line of the flow path from the supply means is closely spaced to the center line of the path of flow into the discharge chute, even though the span of the feed conveyor necessary to accomplish the gravimetric flow control is substantially greater than the spacing between such center lines.

While the invention has been shown and described with respect to specific embodiments thereof, this is intended for the purpose of illustration, rather than limitation, and other variations and modifications of the specific embodiments herein shown and described will be apparent to those skilled in the art, all within the intended spirit and scope of the invention. Accordingly, the patent is not to be limited in scope and effect to the specific embodiments herein shown and described, nor in any other way that is inconsistent with the extent to which the progress in the art has been advanced by the invention.

What is claimed is:

1. In apparatus for measuring and feeding particulate material at a controlled feed rate from supply means with a generally vertical line of flow located above said apparatus and supplying said material to a discharge chute located below said apparatus and also having a generally vertical line of flow closely spaced from the line of flow of said supply means, said apparatus including a housing with an upwardly facing inlet communicating with said supply means and centered on said vertical line of flow and a downwardly facing outlet communicating with said discharge chute, feeder conveyor means comprising a first endless belt with a generally horizontal upper span adapted to receive material from said supply means through said inlet at one end of said span and convey a measured quantity by weight of said material thereon to a first exit zone at the opposite end of said span, which zone is located a lateral distance substantially greater than the lateral distance between said lines of flow of said supply means and said discharge chute, and gravimetric feed control means operatively associated with said feeder conveyor means for measuring by weight the rate of flow of said material along said span and controlling the rate of flow across said span in accordance with the measured weight, the improvement which comprises:

return conveyor means in said housing located below said first endless belt and including a second endless belt with an upper span inclined downwardly in the direction of feed to said discharge chute and being positioned to receive said particulate material from said exit zone and to transport said material in a generally reverse and downwardly inclined direction relative to the direction of travel of the upper span of said first belt to a second exit zone above said discharge chute through which said particulate material leaves said housing at a controlled feed rate corresponding to the rate produced by said gravimetric feed control means.

2. Apparatus for feeding particulate coal in a controlled feed rate comprising a housing, inlet opening means in said housing permitting entrance of particulate coal into said housing at a feed location, discharge opening means from said housing permitting downward discharge of particulate coal from said housing, laterally extending first conveyor means in said housing for laterally transporting particulate coal from said feed location to a first discharge location of said first conveyor means that is offset laterally from said discharge opening means in said housing in a direction away from said inlet opening means and said discharge opening means so that the lateral distance between said inlet opening means and said discharge opening means of said housing is substantially less than the lateral distance between said feed location and said first discharge location of said first conveyor means, feed control means operatively associated with said first conveyor means between its feed location and its first discharge location for controlling the amount of coal received by and discharged by said first conveyor means and the rate of discharge thereof, and second conveyor means below said first conveyor means for receiving coal discharge at said first discharge location from said first conveyor means and for transporting said coal in a direction generally downwardly inclined and opposite to the direction of travel of coal on said first conveyor means and for discharging it at a second discharge location into said discharge opening means of said housing at a controlled feed rate corresponding to the rate of discharge from said first conveyor means.

3. The apparatus of claim 2 comprising clearing means for moving to said discharge opening means in said housing particulate coal that drops off one of said conveyor means.

4. The apparatus of any of claims 2 or 3 in which said first conveyor means comprises an endless belt the upper span of which transports said particulate coal.

5. The apparatus of any of claims 2 or 3 in which said second conveyor means comprises an endless belt the upper span of which transports particulate coal discharged thereon from said first conveyor means.

6. The apparatus of any of claims 2 or 3, in which said first conveyor means comprises an endless belt having an upper span that transports said particulate coal from said feed location to said discharge location, and in which said second conveyor means comprises an endless belt having an upper span that transports particulate coal discharged thereon from said first conveyor means to said discharge opening means.

* * * * *